United States Patent
You et al.

(10) Patent No.: US 10,606,798 B2
(45) Date of Patent: Mar. 31, 2020

(54) METHOD FOR CONFIGURING ADDRESS TABLE, FPGA, AND NETWORK DEVICE APPLYING FPGA

(71) Applicant: Huawei Technologies Co., Ltd., Shenzhen (CN)

(72) Inventors: Kejian You, Shenzhen (CN); Weibo Xiong, Nanjing (CN); Chao Kong, Nanjing (CN); Binbin Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/218,879

(22) Filed: Dec. 13, 2018

(65) Prior Publication Data
US 2019/0179797 A1 Jun. 13, 2019

(30) Foreign Application Priority Data
Dec. 13, 2017 (CN) .......................... 2017 1 1329166

(51) Int. Cl.
| | |
|---|---|
| *G06F 15/78* | (2006.01) |
| *G06F 3/023* | (2006.01) |
| *G06F 9/32* | (2018.01) |
| *G06F 12/06* | (2006.01) |
| *H04L 12/741* | (2013.01) |

(52) U.S. Cl.
CPC .......... *G06F 15/7867* (2013.01); *G06F 3/023* (2013.01); *G06F 9/321* (2013.01); *G06F 12/0646* (2013.01); *H04L 45/54* (2013.01); *H04L 45/745* (2013.01)

(58) Field of Classification Search
None
See application file for complete search history.

(56) References Cited

U.S. PATENT DOCUMENTS

| | | | | |
|---|---|---|---|---|
| 8,495,093 | B2 * | 7/2013 | Baudel ................ | G06F 16/2246 707/790 |
| 9,967,187 | B2 * | 5/2018 | Levy ................... | H04L 45/7453 |
| 2011/0292943 | A1 * | 12/2011 | Du ...................... | H04L 45/7453 370/392 |
| 2011/0320693 | A1 * | 12/2011 | Assarpour .......... | H04L 12/4625 711/104 |

OTHER PUBLICATIONS

Foreign Communication From a Counterpart Application, European Application No. 18211793.7, Extended European Search Report dated May 9, 2019, 8 pages.

* cited by examiner

*Primary Examiner* — Crystal L Hammond
(74) *Attorney, Agent, or Firm* — Conley Rose, P.C.

(57) ABSTRACT

A method for configuring an address table in a field-programmable gate array (FPGA), an FPGA, and a network device applying the FPGA, where the FPGA includes k storage blocks, the k is greater than or equal to the two, and the FPGA is configured to obtain a key, where the key is generated based on a first packet of a data stream, and a length of the key is equal to a key bit width of the FPGA, obtain an index number corresponding to the key, where the index number is used to search for a forwarding entry of the data stream, divide the key into k sub-keys, where each of the k sub-keys corresponds to one of the k storage blocks, determine an address entry of each of the k sub-keys in a corresponding storage block, and write a storage address to the address entry based on the index number.

20 Claims, 9 Drawing Sheets

METHOD FOR CONFIGURING ADDRESS TABLE, FPGA, AND NETWORK DEVICE APPLYING FPGA

CROSS-REFERENCE TO RELATED APPLICATION

This application claims priority to Chinese Patent Application No. 201711329166.8 filed on Dec. 13, 2017, which is hereby incorporated by reference in its entirety.

TECHNICAL FIELD

The present disclosure relates to network communications technologies, and in particular, to a method for configuring an address table, a field-programmable gate array (FPGA), and a network device applying the FPGA.

BACKGROUND

In network communications, when many network protocols are implemented, a corresponding storage address needs to be found in an address table based on input data (referred to as a key), and target data in the storage address is obtained. For example, when a switch receives a data frame from an interface, the switch extracts a destination media access control (MAC) address of the data frame, searches an address table based on the destination MAC address to obtain a corresponding storage address, and then reads a forwarding entry corresponding to the storage address to obtain a corresponding port and forwards the data frame to the port.

Currently, an FPGA in a switch is usually used to perform the function of searching an address table. When the address table is of a relatively large size, the address table is stored in a content addressable memory (CAM) that is connected to the FPGA and that supports parallel search. However, the CAM features large power consumption and high costs. In some scenarios in which an address table is of a relatively small size (for example, with less than one thousand (1 k) entries) but there is a relatively large bandwidth (that is, scenarios in which a large quantity of packets need to be processed per unit time), the FPGA needs to access the CAM frequently per unit time. In this case, deploying the CAM outside the FPGA leads to high costs, and fast search cannot be implemented.

SUMMARY

The present disclosure provides a method for configuring an address table in an FPGA, an FPGA, and a network device applying the FPGA such that the address table can be stored in the FPGA, a quantity of entries in the address table on the FPGA is reduced, and search efficiency of the FPGA is improved.

A first aspect of the present disclosure provides a method for configuring an address table, where the method is applied to an FPGA, and the FPGA includes k storage blocks, where k is greater than or equal to 2. The FPGA obtains a key, where the key is generated based on a first packet of a data stream, and a length of the key is equal to a key bit width of the FPGA. The FPGA obtains an index number corresponding to the key, where the index number is used to search for a forwarding entry of the data stream. The FPGA divides the key into k sub-keys, where each of the k sub-keys corresponds to one of the k storage blocks. The FPGA determines an address entry of each of the k sub-keys in a corresponding storage block, and writes a storage address to the address entry based on the index number.

In the foregoing method of the present disclosure, in a process of configuring an address table, the FPGA divides a key with a large bit width into k sub-keys with a small bit width, and writes a corresponding storage address to the k relatively small storage blocks based on the k sub-keys and an index number of a forwarding entry of a data stream corresponding to the key such that the finally generated address table has only a relatively small quantity of entries, and therefore can be stored in the FPGA. This avoids a problem of an excessively large quantity of entries caused during generation of an address table for a key with a large bit width, and saves storage space of the FPGA.

Optionally, before obtaining the key, the FPGA is further configured to obtain the key bit width of the FPGA and obtain an address bit width of the FPGA, where the address bit width is used to determine a maximum quantity of entries of an address table in each storage block of the FPGA. The FPGA determines the k storage blocks based on the key bit width and the address bit width.

Optionally, the FPGA determines a storage block quantity k corresponding to the key bit width and the address bit width, and determines the k storage blocks from a storage area of the FPGA based on the address bit width and the storage block quantity k.

The FPGA determines the quantity of storage blocks based on the key bit width and the address bit width of the FPGA such that storage space of the FPGA can be fully utilized.

Optionally, a data bit width of each storage block is a maximum data bit width that can be provided by the FPGA such that a quantity of forwarding entries of a forwarding table of a network device in which the FPGA is located may be the maximum data bit width, and search performance of the FPGA can be fully utilized.

Optionally, when writing a storage address to the address entry based on the index number, the FPGA determines the address entry of each of the k sub-keys in the corresponding storage block, sets a bit corresponding to the index number in the address entry to 1, and keeps values of other bits in the address entry unchanged.

The foregoing encoding scheme is referred to as one-hot code. The encoding scheme of one-hot code is used such that each sub-key occupies only one bit in the address entry of the corresponding storage block. In this way, sub-keys of another key may occupy other bits of the address entry, improving a reuse rate of the address entry, and ensuring that a quantity of forwarding entries of the forwarding table that can be used for search in the FPGA is equal to a maximum data bit width of the FPGA.

Optionally, the FPGA receives a search request, where the search request is generated based on a second packet of the data stream, the search request includes the key, and a length of the key is equal to the key bit width of the FPGA. The FPGA divides the key into the k sub-keys. The FPGA reads, using each of the k sub-keys as an address, a storage address in an address entry in a storage block corresponding to the sub-key to obtain k storage addresses. The FPGA performs an AND operation on the k storage addresses to obtain a target storage address, and generates the index number based on the target storage address.

In the foregoing process, the FPGA divides the received key into the k sub-keys, and concurrently reads the k storage blocks based on the k sub-keys to obtain the k storage addresses in the k storage blocks and obtain the target storage address based on the k storage addresses, and generates the index number based on the target storage address. Because the FPGA concurrently reads the k relatively small address tables based on the k sub-keys, the k storage addresses can be obtained quickly and then the index number is obtained. Therefore, search efficiency of the FPGA is improved.

The method and various optional implementations in the first aspect of the present disclosure may be randomly combined in a reasonable manner, and all combinations fall within the protection scope of the present disclosure.

A second aspect of the present disclosure provides an FPGA, and the FPGA includes a calculation circuit and k storage blocks, where k is greater than or equal to 2. The calculation circuit is configured to obtain a key, where the key is generated based on a first packet of a data stream, and a length of the key is equal to a key bit width of the FPGA, obtain an index number corresponding to the key, where the index number is used to search for a forwarding entry of the data stream, divide the key into k sub-keys, where each of the k sub-keys corresponds to one of the k storage blocks, determine an address entry of each of the k sub-keys in the corresponding storage block, and write a storage address to the address entry based on the index number. Each of the k storage blocks is configured to store the storage address written by the calculation circuit.

Optionally, before obtaining the key, the calculation circuit further obtains the key bit width and an address bit width of the FPGA, where the address bit width is used to determine a maximum quantity of entries of an address table in each storage block of the FPGA, and determines the k storage blocks based on the key bit width and the address bit width.

Optionally, when determining the k storage blocks, the calculation circuit determines a storage block quantity k corresponding to the key bit width and the address bit width, and determines the k storage blocks from a storage area of the FPGA based on the address bit width and the storage block quantity k.

Optionally, when writing a storage address to the address entry based on the index number, the calculation circuit determines the address entry of each of the k sub-keys in the corresponding storage block, sets a bit corresponding to the index number in the address entry to 1, and keeps values of other bits in the address entry unchanged.

Optionally, the calculation circuit further receives a search request, where the search request is generated based on a second packet of the data stream, and the search request includes the key. The calculation circuit divides the key into the k sub-keys, where each key corresponds to one of the k storage blocks. The calculation circuit reads, using each of the k sub-keys as an address, a storage address in an address entry in a storage block corresponding to the sub-key to obtain k storage addresses. The calculation circuit performs an AND operation on the k storage addresses to obtain a target storage address, and generates the index number based on the target storage address.

The FPGA and various optional implementations in the second aspect of the present disclosure may be randomly combined in a reasonable manner, and all combinations fall within the protection scope of the present disclosure.

The FPGA and the implementations in the second aspect of the present disclosure are the apparatuses corresponding to the method and its implementations in the first aspect. For beneficial effects thereof, refer to the method and the implementations in the first aspect.

A third aspect of the present disclosure provides a network device, where the network device includes a processor and an FPGA, and the FPGA includes k storage blocks. The processor receives a first packet of a data stream, generates a key and an index number based on the first packet, where a length of the key is equal to a key bit width of the FPGA, and the index number is used to search for a forwarding entry of the data stream, and sends the key and the index number to the FPGA. The FPGA receives the key and the index number, divides the key into k sub-keys, where each of the k sub-keys corresponds to one of the k storage blocks. The FPGA determines an address entry of each of the k sub-keys in a corresponding storage block, and writes a storage address to the address entry based on the index number.

Optionally, the FPGA is further configured to obtain the key bit width of the FPGA and obtain an address bit width of the FPGA, where the address bit width is used to determine a maximum quantity of entries of an address table in each storage block of the FPGA. The FPGA further determines the k storage blocks based on the key bit width and the address bit width.

Optionally, when determining the k storage blocks, the FPGA determines a storage block quantity k corresponding to the key bit width and the address bit width, and determines the k storage blocks from a storage area of the FPGA based on the address bit width and the storage block quantity k.

Optionally, when writing a storage address to the address entry based on the index number, the FPGA determines the address entry of each of the k sub-keys in the corresponding storage block, sets a bit corresponding to the index number in the address entry to 1, and keeps values of other bits in the address entry unchanged.

Optionally, when generating the index number based on the first packet, the processor generates the forwarding entry for the data stream based on the first packet, writes the forwarding entry to a forwarding table, and uses a sequence number of the forwarding entry in the forwarding table as the index number.

Optionally, the processor further receives a second packet of the data stream, where the second packet is a subsequent packet of the first packet, generates the key based on the second packet, and sends a search request to the FPGA, where the search request includes the key. The FPGA further receives the search request, divides the key into the k sub-keys, reads, using each of the k sub-keys as an address, a storage address in an address entry in a storage block corresponding to the sub-key, to obtain k storage addresses, performs an AND operation on the k storage addresses to obtain a target storage address, and generates the index number based on the target storage address. The FPGA further sends the index number to the processor, the processor further receives the index number, obtains the forwarding entry based on the index number, and forwards the second packet based on the forwarding entry.

The network device and various optional implementations in the third aspect of the present disclosure may be randomly combined in a reasonable manner, and all combinations fall within the protection scope of the present disclosure.

When receiving a packet of a new data stream, the processor of the network device according to this embodiment of the present disclosure establishes a forwarding entry for the data stream, and enables the FPGA of the network device to store, in an address table, a storage address obtained based on an index number of the forwarding entry. When receiving a subsequent packet of the data stream, the processor may obtain an index number corresponding to the forwarding entry using the address table in the FPGA, search for the forwarding entry based on the index number, and then forward the subsequent packet based on the forwarding entry. The address table is configured based on the method in the first aspect, so the address table in the FPGA is of a relatively small size, and a search speed is relatively fast. Therefore, the present disclosure can improve forwarding efficiency of the network device.

BRIEF DESCRIPTION OF DRAWINGS

To describe the technical solutions in some embodiments of the present disclosure more clearly, the following briefly describes the accompanying drawings describing some of the embodiments of the present disclosure.

DESCRIPTION OF EMBODIMENTS

Currently, to avoid high costs caused by deploying a CAM outside an FPGA when an address table is of a relatively small size, a RAM inside the FPGA is usually used to store the address table when the address table is of a relatively small size.

Figure 1:
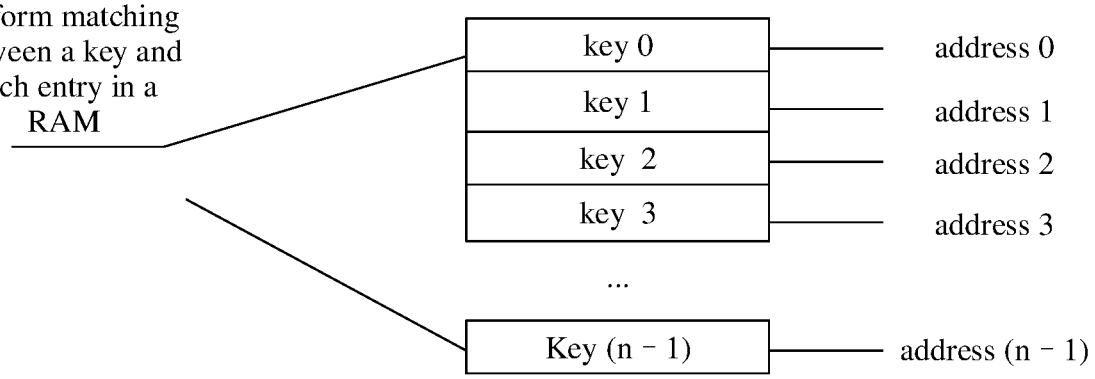
FIG. 1 is a schematic diagram of a process of searching an address table when an address table is stored using a random access memory (RAM) inside an FPGA.

FIG. 1 is a schematic diagram of a process of searching an address table when the address table is stored using a RAM inside an FPGA. After a network device receives a packet, a processor of the network device extracts a key of the packet and sends the key to the FPGA of the network device. For example, the key may be at least one of a source Internet Protocol (IP) address, a destination IP address, a source MAC address, a destination MAC address, a virtual local area network (VLAN) identifier (ID), a transport protocol, a source port number, and a destination port number. As shown in FIG. 1, it is assumed that the address table includes n entries, and each entry includes a preset key, for example, key 0 to key (n−1). The FPGA sequentially compares the key with each preset key in the address table, and when a preset key (such as key 1) matches the key, a storage address of the preset key (for example, address 1 corresponding to key 1) is used as a found storage address. The storage address of the preset key may be a number of an entry in which the preset key is located or a hardware address of the entry in the RAM. Then, the FPGA may read data from a forwarding table based on the storage address and send the data to the processor, or the FPGA may send the storage address to the processor, and the processor reads data from a forwarding table based on the storage address. For example, the network device may be a switch, a router, a server or a host with a virtual network function, or the like. That a preset key matches the key may mean that the preset key is the same as the key, or the preset key and the key have a same specified bit.

In the foregoing solution, a serial search manner is used, and the RAM can be accessed only once per clock cycle. When a quantity of entries in the address table in the RAM is n, in a worst case, n clock cycles are required to find the storage address corresponding to the key. As a result, search efficiency is relatively low.

In another manner, a function of the CAM is implemented using the RAM inside the FPGA. When the CAM is implemented using the RAM, an address table is first generated in the RAM based on a key bit width (that is, a length of the key) that can be processed by the FPGA. If the key bit width is N, a quantity of entries in the address table is $2^N$, and a storage address is stored in each entry of the address table, that is, the storage address is written as entry data to the entry. The storage address written to an entry may be or may not be empty.

Figure 2:
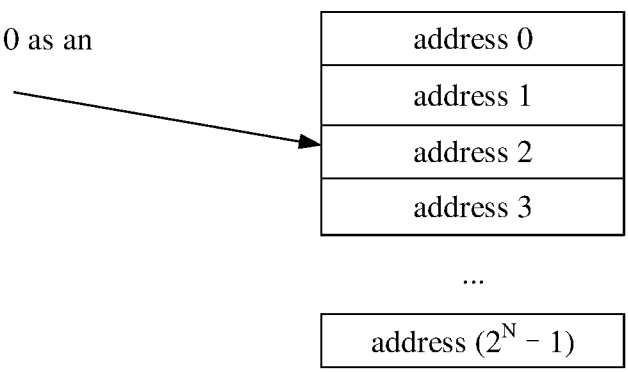
FIG. 2 is a schematic diagram of a process of searching an address table when a function of a CAM is implemented using a RAM inside an FPGA.

As shown in FIG. 2, when an FPGA receives a key, the FPGA directly reads, using the key as an address, a storage address in an entry corresponding to the address in the address table. For example, when a bit width of the key is 8 bits and the key is 00000010, 00000010 is used as the address to read an entry in the address table, and an obtained storage address in the entry is address 2, where address 2 is a storage address of target data.

In the method shown in FIG. 2, instead of performing matching on all entries in the address table one by one, the FPGA performs only one search to obtain the storage address corresponding to the key. However, when the key bit width is relatively large, a quantity of required entries in the address table increases exponentially, wasting storage space of the FPGA.

Figure 3:
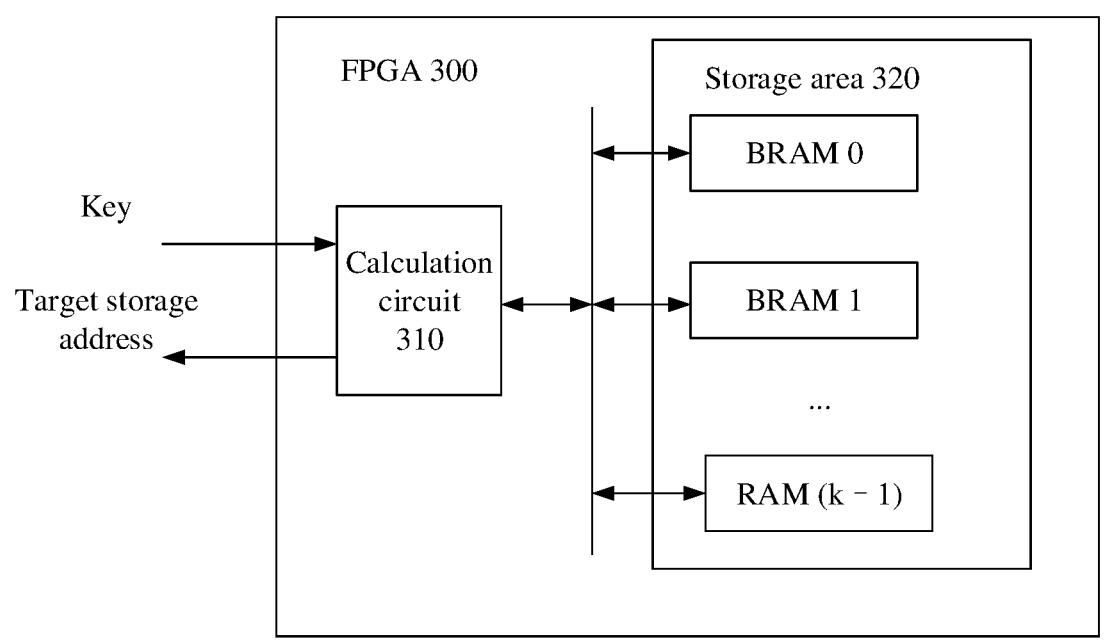
FIG. 3 is a schematic structural diagram of an FPGA according to an embodiment of the present disclosure.

This embodiment of the present disclosure provides an improved FPGA to quickly obtain a storage address corresponding to a key with a large bit width and save storage space of the FPGA. In an implementation, the FPGA is configured to store a forwarding table of the network device. The forwarding table is usually used for network bridging, routing, or a similar function to find an interface used to forward a packet. For example, the forwarding table may be a routing table or a MAC table. As shown in FIG. 3, FIG. 3 is a schematic structural diagram of an FPGA 300 according to an embodiment of the present disclosure. The FPGA 300 includes a calculation circuit 310 and a storage area 320, and the storage area 320 may be divided into k storage blocks based on a requirement, where k is greater than or equal to 2. When the storage area 320 is divided into k storage blocks, each storage block has a corresponding number or a hardware address, and the number or the hardware address is used to identify the storage block. For example, the k storage blocks are k RAMs. Each storage block includes a plurality of storage sub-blocks, and each storage sub-block may store one storage address. A storage block is configured to write a storage address, and therefore in this application, storage space corresponding to the storage block is referred to as an address table, and storage space corresponding to a storage sub-block is referred to an address entry.

The calculation circuit 310 is configured to configure an address table in the n storage blocks. During configuration of the address table, the calculation circuit 310 performs the method for configuring an address table shown in FIG. 4.

In step 401, the calculation circuit 310 obtains a key bit width A of the FPGA.

The key bit width A of the FPGA is a maximum bit length of a key that can be processed by the FPGA, and depends on a function planned for the FPGA. For example, when the FPGA searches for a storage address based on a quintuple, the key bit width A includes 32 bits of a source IP version 4 (IPv4) address, 32 bits of a destination IPv4 address, 16 bits of a source port number, 16 bits of a destination port number, and 8 bits of a protocol number, that is, a total of 104 bits. When the FPGA searches for a storage address based on a triplet including a source IPv4 address, a destination IPv4 address, and a protocol number, the key bit width A is 72 bits. When the FPGA searches for a storage address based on a VLAN ID (with a length of 12 bits) and a destination MAC address (with a length of 48 bits), the key bit width A is 60 bits.

The following describes this embodiment of the present disclosure using the key bit width A of 12 bits as an example.

In step 402, the calculation circuit 310 obtains an address bit width B.

The address bit width B is used to determine a quantity of address entries that can be stored in each storage block (that is, a maximum quantity of entries in the address table), and may represent a length of a hardware address of an address entry. The storage block may be the RAM in FIG. 3. Each storage block is equivalent to an address table, and the address table can store a maximum of $2^B$ address entries. The following describes this embodiment of the present disclosure using an example in which an address bit width is 6 bits, and each storage block includes $2^6=64$ address entries. The address bit width B may alternatively have another length. For example, when the address bit width is 5 bits, each storage block includes 32 address entries, when the address bit width is 7 bits, each storage block includes 128 address entries.

In an implementation, the address bit width B is determined based on a maximum bit width of a block RAM (BRAM) in the FPGA in order to improve usage of storage resources in the FPGA.

In step 403, the calculation circuit 310 determines a storage block quantity k corresponding to the key bit width A and the address bit width B.

In an implementation, the calculation circuit 310 determines the required storage block quantity k based on the key bit width A and the address bit width B. Further, the calculation circuit 310 determines the quantity of required storage blocks according to the following equation 1:

$$k=A/B.\qquad\text{equation 1}$$

For example, when the key bit width is 12 bits and the address bit width is 6 bits, two storage blocks are required. The address bit width is 6 bits, and each storage block is equivalent to one address table including $2^6=64$ address entries.

By performing the foregoing steps 401 to 403, the calculation circuit 310 determines a required storage block quantity k to implement a search based on a key with a bit width.

In another implementation, the key bit width A, the address bit width B, and the storage block quantity k may be directly configured and loaded into the FPGA when the FPGA is powered on. Therefore, the foregoing steps 410 to 430 are optional implementations of this embodiment of the present disclosure.

Further, in this embodiment of the present disclosure, a data bit width of a storage block may be further configured, that is, a length of a storage address in the address table stored in the storage block may be configured.

Figure 5A:
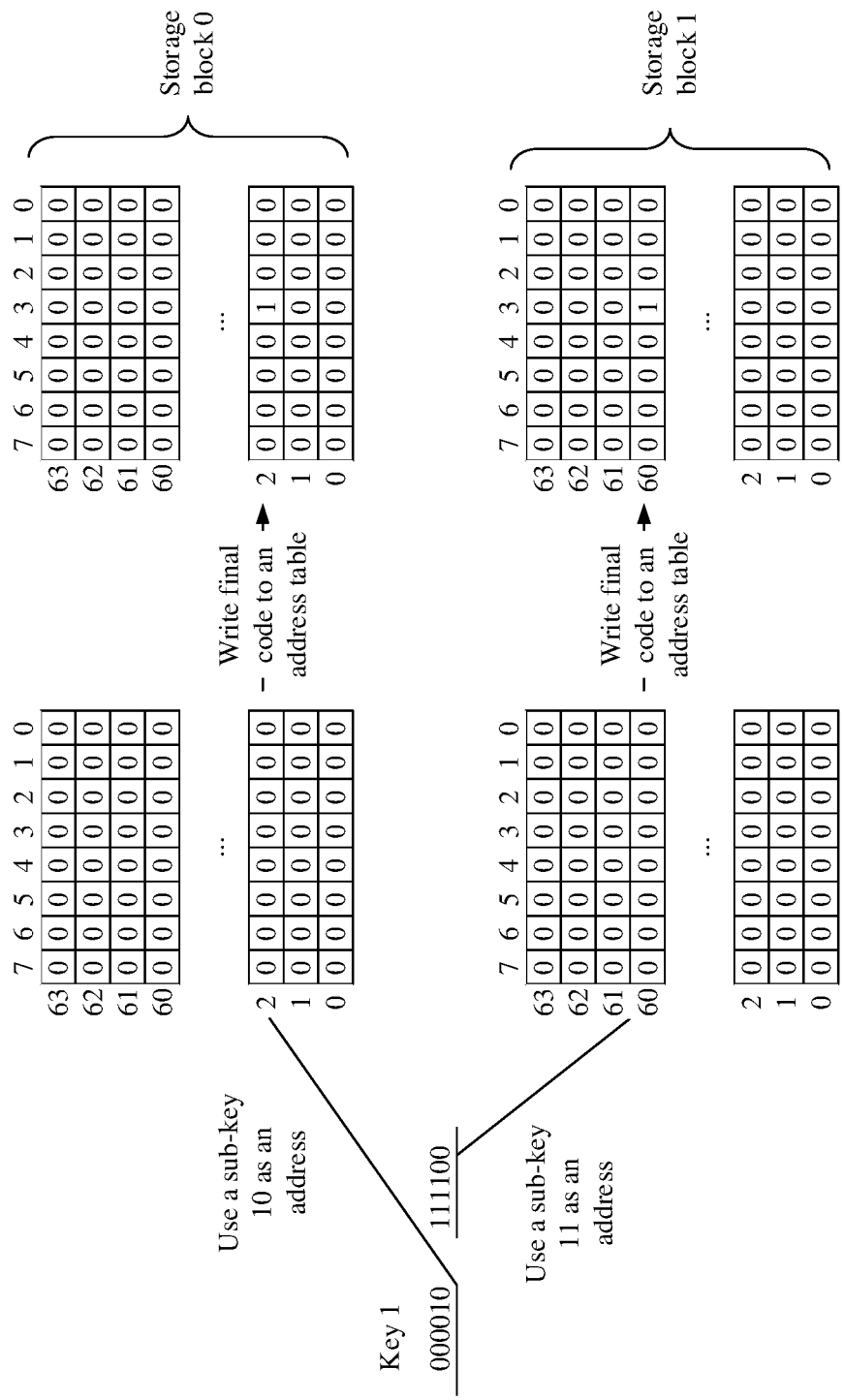
FIG. 5A and FIG. 5B are schematic diagrams of a process of configuring an address table in an FPGA according to an embodiment of the present disclosure.
Figure 5B:
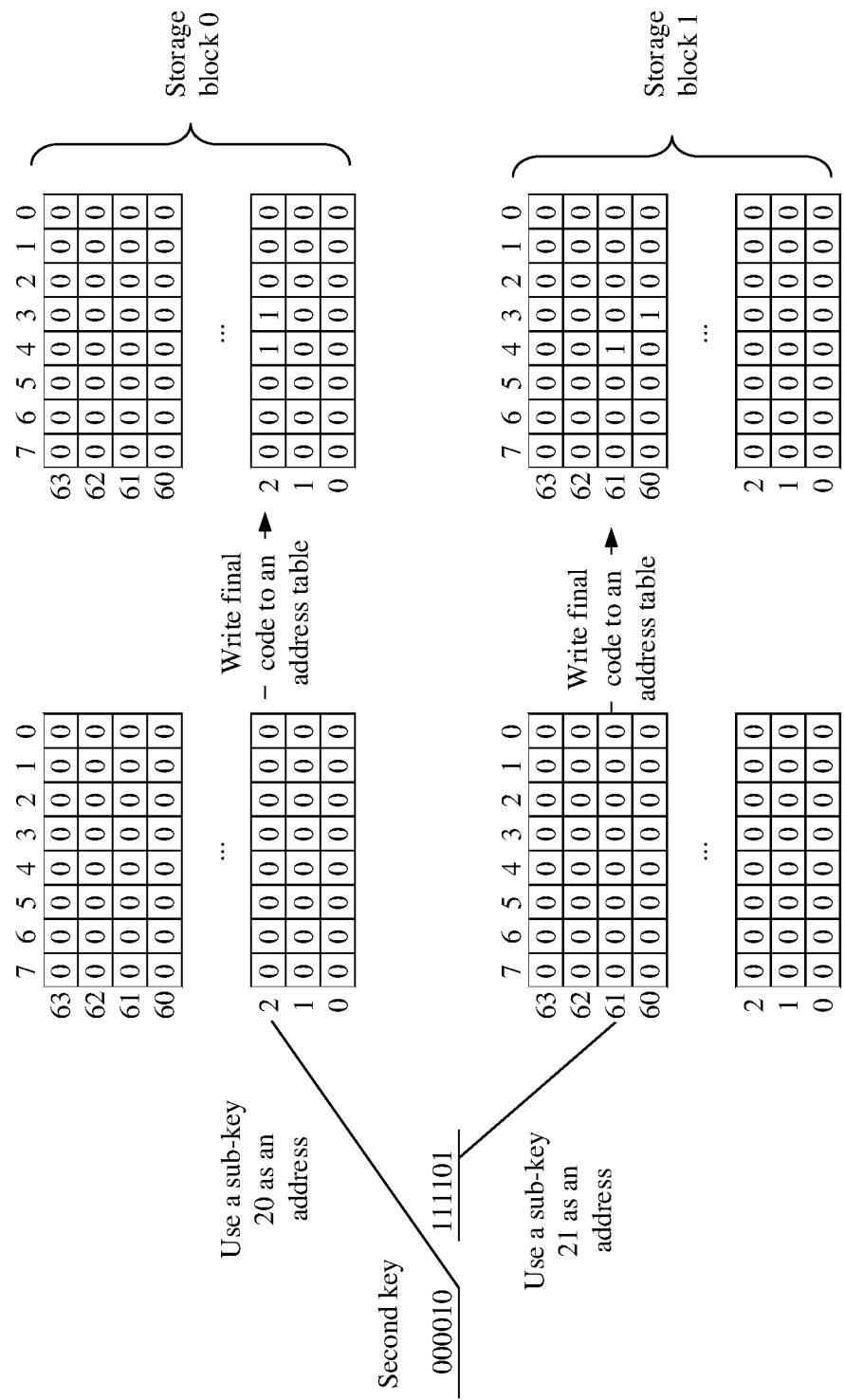

With reference to FIG. 5A and FIG. 5B, the following describes a process of generating an address table by the calculation circuit 310. The process of generating an address table is a process that the calculation circuit 310 writes a storage address to a storage block.

In step 404, the calculation circuit 310 determines k storage blocks from a storage area based on the address bit width B and the storage block quantity k.

For example, when the address bit width B is 6 bits and the storage block quantity k is 2, the calculation circuit 310 determines two storage blocks from an unoccupied storage area of the FPGA, and each storage block may store 64 storage addresses.

Step 404 needs to be performed only once before a key is generated. The k storage blocks are of a same size, that is, the k storage blocks have a same quantity of address entries.

In step 405, the calculation circuit 310 obtains a key, where a length of the key is A.

The calculation circuit 310 may receive the key that is sent by a processor and that is generated based on a first packet of a first data stream, and the length of the key is A. For example, in FIG. 5A, A is 12 bits, and a first key is 000010111100, in FIG. 5B, A is 12 bits, and a second key is 000010111101. Further, the key is generated by the processor based on the first packet and the key bit width A of the FPGA. The first packet may be an Ethernet frame, an IPv4 packet, an IP version 6 (IPv6) packet, or the like. The first data stream may be any data stream.

In step 406, the calculation circuit 310 obtains an index number corresponding to the key.

When receiving the first packet belonging to the first data stream for the first time, the processor finds that no forwarding entry corresponding to the first data stream is stored in a forwarding table, and then the processor generates a corresponding forwarding entry for the first data stream based on information in the first packet (for example, a quintuple including a source IP address, a source MAC address, a destination IP address, a destination MAC address, and an ID of a transport layer protocol of the first packet, or a triplet including a source IP address, a destination IP address, and an ID of a transport layer protocol of the first packet), writes the forwarding entry to the forwarding table, determines an index number of the forwarding entry, and sends the index number to the calculation circuit 310 of the FPGA. The index number is used to search for the forwarding entry of the first data stream from the forwarding table. The index number does not exceed a data bit width of a storage block in the FPGA.

For example, in FIG. 5A and FIG. 5B, the data bit width of the storage block (that is, a length or a quantity of bits of a storage address) is 8, and the index number may be any one of 0 to 7. In the implementation shown in FIG. 5A, the index number is 3, in the implementation shown in FIG. 5B, the index number is 4. In an embodiment, the data bit width of the storage block may be hundreds of bits to thousands of bits. Correspondingly, there may be up to thousands of entries in the forwarding table. For example, when the data bit width of the storage block is 1024 bits, the index number may be any one of 0 to 1023.

The processor may send the key and the index number simultaneously or separately to the calculation circuit 310. That is, step 405 and step 406 may be performed simultaneously or may be performed separately. An order of performing the steps separately is not limited in this embodiment of the present disclosure. In step 407, the calculation circuit 310 divides the key into k sub-keys.

The calculation circuit 310 divides evenly the key into k sub-keys based on the storage block quantity k, and the k sub-keys are in a one-to-one correspondence with the k storage blocks. For example, a sub-key $k_i$ corresponds to a storage block i, where i·(0, 1, . . . , (k−1)). For another example, in FIG. 5A, the first key 000010111100 is divided into a sub-key 10 (000010) and a sub-key 11 (111100), the sub-key 10 corresponds to a storage block 0, and a sub-key 11 corresponds to a storage block 1. In FIG. 5B, the second key 000010111101 is divided into a sub-key 20 (000010) and a sub-key 21 (111101), the sub-key 20 corresponds to a storage block 0, and a sub-key 21 corresponds to a storage block 1.

In step 408, for each sub-key, the calculation circuit 310 determines an address entry in a storage block corresponding to the sub-key, and writes a storage address to the address entry based on the index number.

In an implementation, the calculation circuit 310 determines the address entry of each sub-key in the corresponding storage block, sets a bit corresponding to the index number in the address entry to 1, and keeps values of other bits in the address entry unchanged. A value of another bit may be 0 or another preset value.

For example, in FIG. 5A, the sub-key 10 (that is, the sub-key 000010) corresponds to the storage block 0, and an address entry numbered 2 in the storage block 0 is accessed using the sub-key 000010 as an address. A bit corresponding to the index number of the address entry (that is, a bit 3) is set to 1 with values of other bits being unchanged (assuming that an initial value is 0), and a storage address 00001000 is obtained. Then the storage address 00001000 is written to the address entry numbered 2 of the storage block 0. Similarly, the sub-key 11 (that is, the sub-key 111100) corresponds to the storage block 1, and an address entry numbered 60 in the storage block 1 is accessed using the sub-key 111100 as an address. A bit corresponding to the index number of the address entry (that is, a bit 3) is set to 1, with values of other bits being unchanged (assuming that an initial value is 0), and a storage address 00001000 is also obtained. Then the storage address 00001000 is written to the address entry numbered 60 of the storage block 1.

Further, on a basis of the address table obtained in FIG. 5A, the process of configuring an address table shown in FIG. 5B is performed. In FIG. 5B, the sub-key 20 of the second key 000010111101 (that is, the sub-key 000010) corresponds to the storage block 0, and an address entry numbered 2 in the storage block 0 is accessed using the sub-key 000010 as an address. A bit corresponding to the index number of the address entry (that is, a bit 4) is set to 1, with values of other bits being unchanged (assuming that an initial value is 0), and a storage address 00010000 is obtained. Then the storage address 00010000 is written to the address entry numbered 2 of the storage block 0. In this way, content of the address entry numbered 2 is changed to 00011000. Similarly, the sub-key 21 (that is, the sub-key 111101) corresponds to the storage block 1, and an address entry numbered 61 in the storage block 1 is accessed using the sub-key 111101 as an address. A bit corresponding to the index number of the address entry (that is, a bit 4) is set to 1, with values of other bits being unchanged (assuming that an initial value is 0), and a storage address 00010000 is also obtained. Then the storage address 00010000 is written to the address entry numbered 61 of the storage block 1.

Through the configuration processes in FIG. 5A and FIG. 5B, a total of two storage addresses are written to the storage block 1.

When a storage address is generated based on the index number, an encoding scheme of one-hot code is used. The one-hot code is an encoding scheme in which a quantity of states determines a quantity of bits, only one bit is 1, and all other bits are 0.

The encoding scheme of one-hot code is used such that each sub-key occupies only one bit in the address entry of the corresponding storage block. In this way, sub-keys of another key may occupy other bits of the address entry, improving a reuse rate of the address entry, and ensuring that a quantity of forwarding entries of the forwarding table that can be used for search in the FPGA is equal to a maximum data bit width of the FPGA. For example, in FIG. 5A and FIG. 5B, a data bit width of an address table in each storage block is 8 bits, eight sub-keys with different index numbers may be written to each address entry, eight forwarding entries may be found based on the eight different index numbers, and a maximum of eight forwarding entries may be stored in the forwarding table of the network device.

Figure 4:
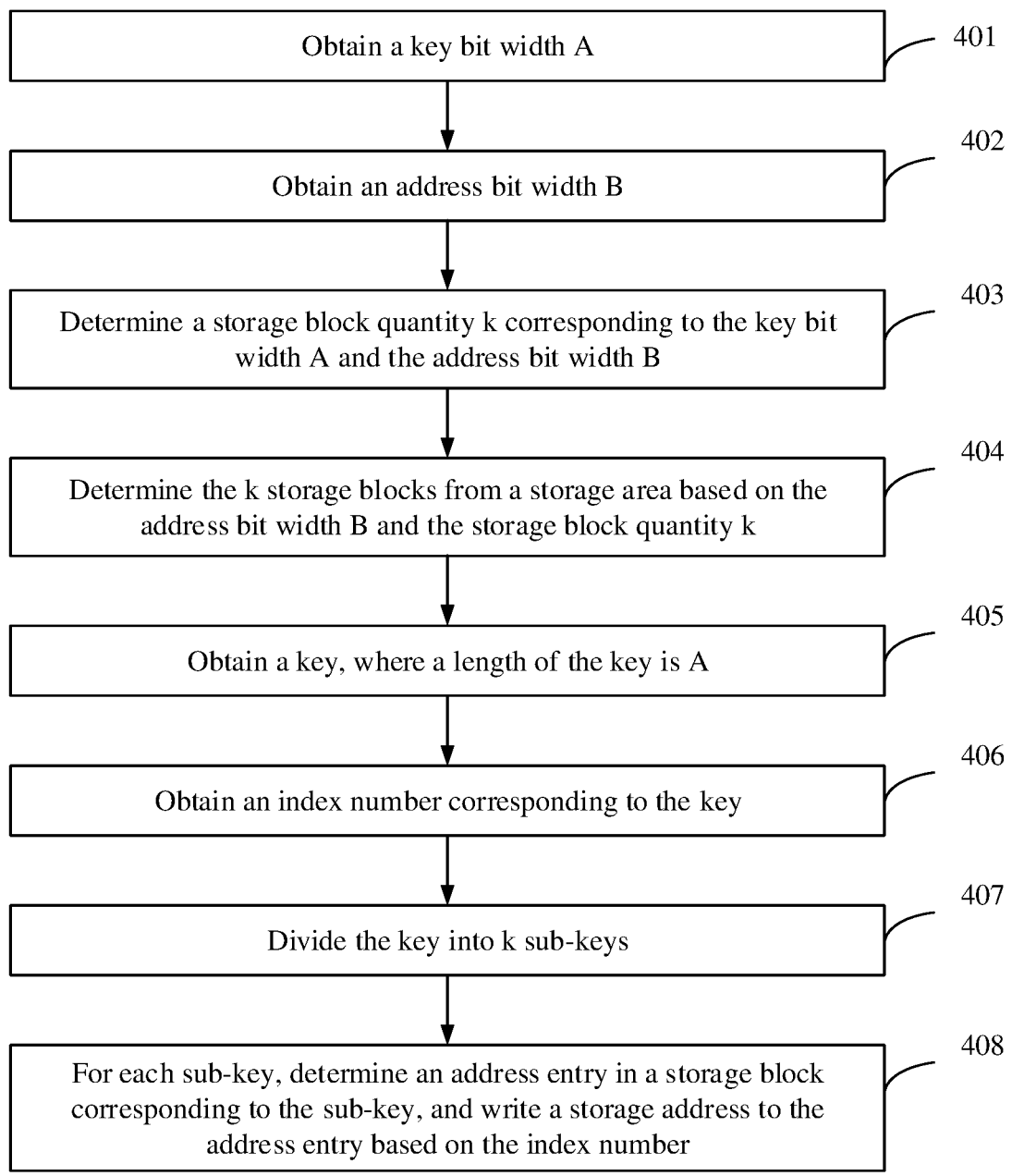
FIG. 4 is a schematic flowchart of a method for configuring an address table in an FPGA according to an embodiment of the present disclosure.

Using the method shown in FIG. 4, k address tables are generated based on the key bit width A and the address bit width B of the FPGA. That is, k=A/B. Each address table includes $2^B$ address entries, and a total of $k*2^B$ address entries are required in the FPGA to implement a search based on a key with the bit width A. For example, the key bit width A=12, the address bit width B=6, and k=2. In the other approaches, a quantity of required address entries is $2^{12}=4096$, and in the solution of this embodiment of the present disclosure, a quantity of required address entries is $2*2^6=128$. For example, the key bit width A=12, the address bit width B=4, and k=3. In the other approaches, a quantity of required address entries is $2^{12}=4096$, and in the solution of this embodiment of the present disclosure, a quantity of required address entries is $3*2^4=48$. It can be learned that this embodiment of the present disclosure can greatly reduce a quantity of address entries that need to be stored by the FPGA, thereby saving storage space of the FPGA.

Figure 6:
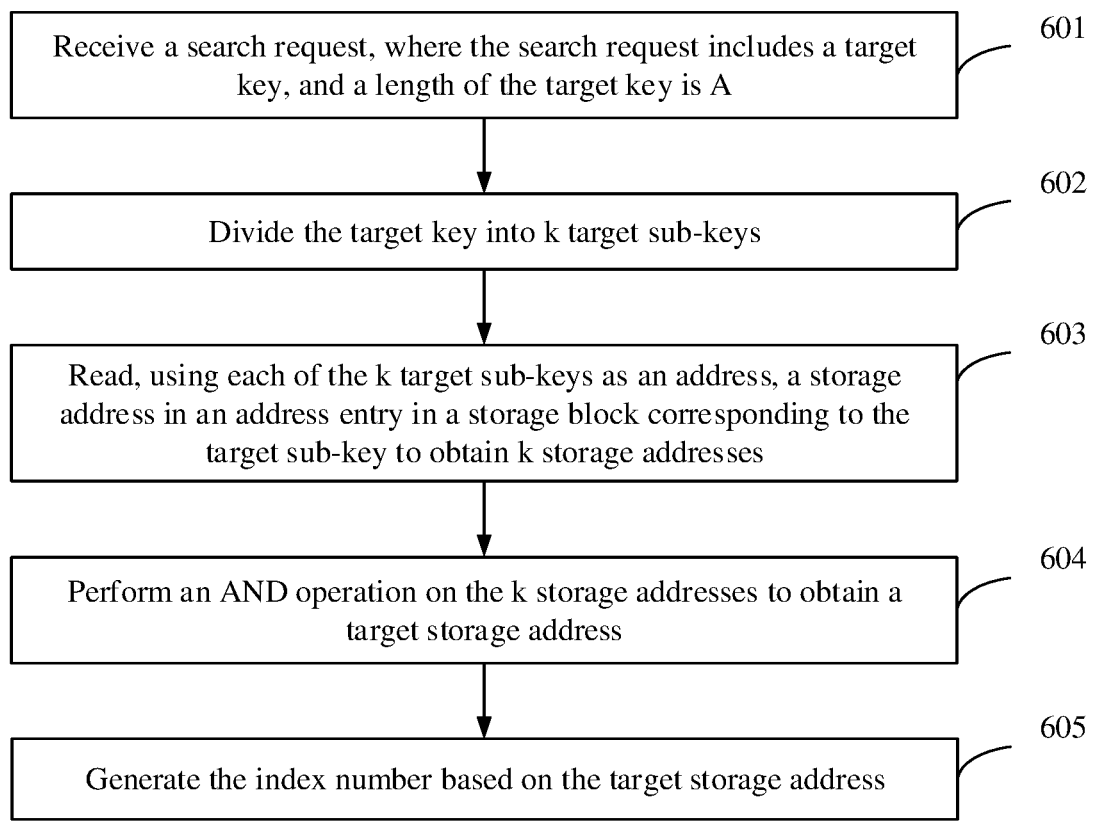
FIG. 6 is a schematic flowchart of a method for searching an address table in an FPGA according to an embodiment of the present disclosure.
Figure 7A:
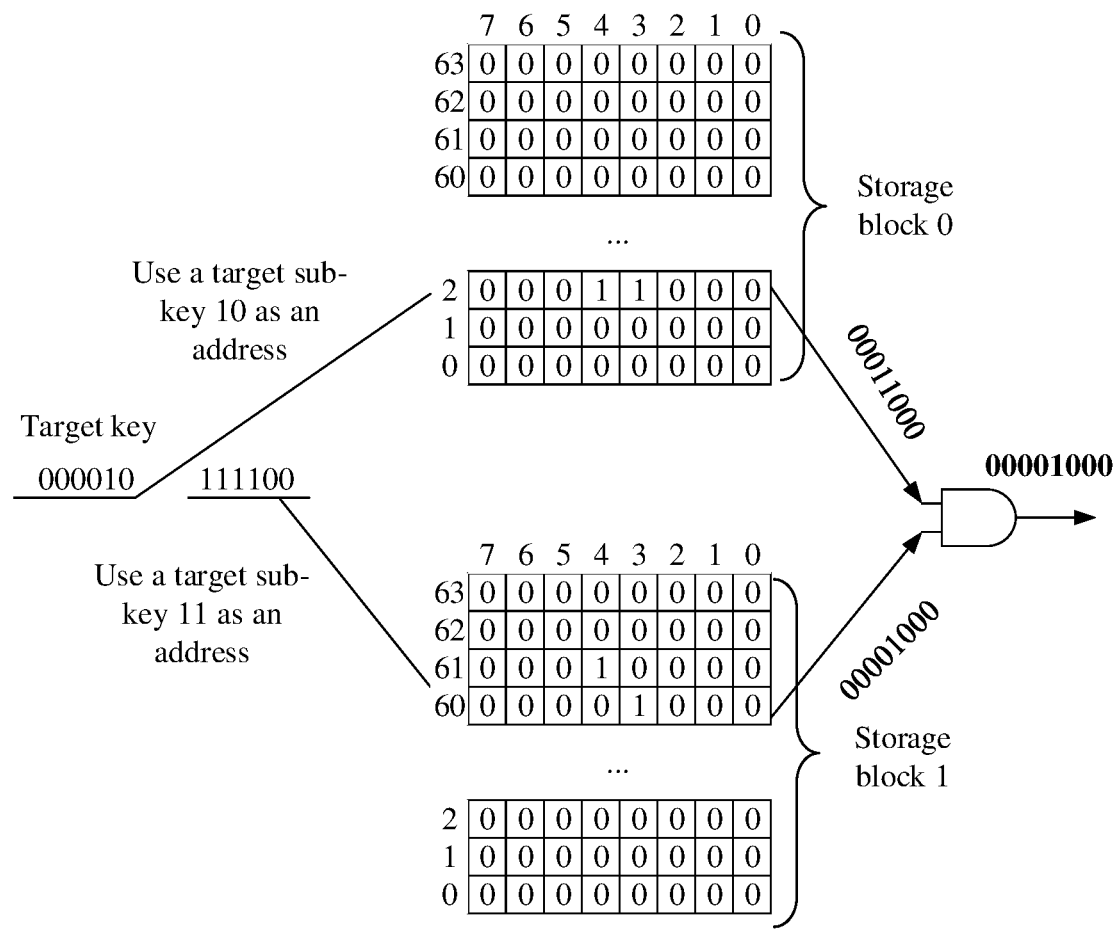
FIG. 7A and FIG. 7B are schematic diagrams of a process of searching an address table in an FPGA according to an embodiment of the present disclosure.
Figure 7B:
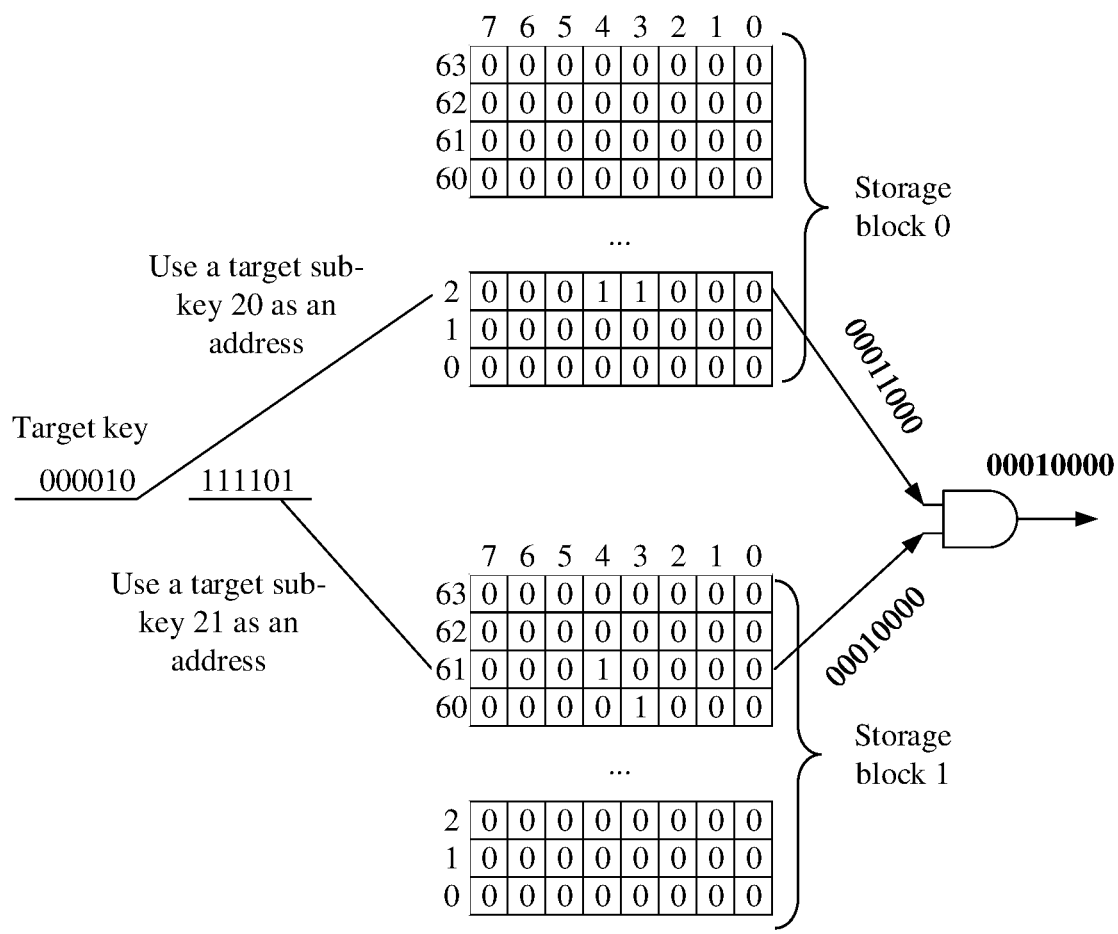

Further, an embodiment of the present disclosure provides a method for searching an address table. The to-be-searched address table is configured based on the method shown in FIG. 4. Therefore, the method for searching an address table may be considered as a continuation of the method for configuring an address table shown in FIG. 4. With reference to FIG. 6, FIG. 7A, and FIG. 7B, the following describes the method for searching an address table. FIG. 6 is a schematic flowchart of the method for searching an address table, and FIG. 7A and FIG. 7B are schematic diagrams of a process for searching an address table.

In step 601, the calculation circuit 310 receives a search request, where the search request includes a target key, and a length of the target key is A.

The search request may be sent by a processor to an FPGA or generated by another component in the FPGA.

Further, when a network device receives a second packet of the first data stream, the processor of the network device generates the target key based on the key bit width A of the FPGA and the second packet. The second packet is any packet, after the first packet, that belongs to the first data stream. Both the first packet and the second packet are packets belonging to the first data stream, and therefore a stream ID that is of the first packet and that is used to generate a key, for example, a quintuple or a triplet of the first data stream is the same as a stream ID that is of the second packet and that is used to generate a key. Therefore, the key generated based on the second packet, that is, the target key, should also be the same as the key generated based on the first packet. For ease of description, in FIG. 7A, the key 000010111100 in FIG. 5A is used as the target key, in FIG. 7B, the key 000010111101 in FIG. 5B is used as the target key.

In step 602, the calculation circuit 310 divides the target key into k target sub-keys.

In an implementation, the calculation circuit 310 divides the target key into the k target sub-keys based on an address bit width B of the FPGA.

For example, in FIG. 7A, the address bit width B of the FPGA is 6 bits, and the target key 000010111100 is divided into two target sub-keys, a target sub-key 10 (000010) and a target sub-key 11 (111100). Similarly, in FIG. 7B, the target key 000010111101 is divided into two target sub-keys, a target sub-key 20 (000010) and a target sub-key 21 (111101).

In step 603, the calculation circuit 310 reads, using each of the k target sub-keys as an address, a storage address in an address entry in a storage block corresponding to the target sub-key to obtain k storage addresses.

In this step, the calculation circuit 310 reads the address table obtained using the method for configuring an address table in FIG. 4. For example, in FIG. 7A, the calculation circuit 310 reads, using the target sub-key 000010 as the address, a storage address in an address entry numbered 2 in the storage block 0 to obtain the storage address 00011000. In addition, the calculation circuit 310 reads, using the target sub-key 111100 as the address, a storage address in an address entry numbered 60 in the storage block 1 to obtain the storage address 00001000. In FIG. 7B, the calculation circuit 310 reads, using the target sub-key 000010 as the address, the storage address in the address entry numbered 2 in the storage block 0 to obtain the storage address 00011000. In addition, the calculation circuit 310 reads, using the target sub-key 111100 as the address, a storage address in an address entry numbered 61 in the storage block 1 to obtain the storage address 00010000.

In this application, the calculation circuit does not need to sequentially compare the target sub-key with each sub-key stored in a storage block, but directly reads, using the target sub-key as the address, the storage address in the corresponding storage block. In addition, the k target sub-keys correspond to different storage blocks, and the calculation circuit 310 may read the k storage blocks concurrently based on the k target sub-keys. Therefore, the calculation circuit 310 can quickly obtain different storage addresses, improving a search speed.

In step 604, the calculation circuit 310 performs an AND operation on the k storage addresses to obtain a target storage address.

The target storage address is a storage address of target data.

For example, in FIG. 7A, the calculation circuit 310 performs an AND operation on the storage address 00011000 and the storage address 00001000 to obtain the target storage address 00001000, in FIG. 7B, the calculation circuit 310 performs an AND operation on the storage address 00011000 and the storage address 00010000 to obtain the target storage address 00010000.

In the process of searching the address table, the calculation circuit 310 only needs to concurrently read k address entries corresponding to the k sub-keys, to obtain k storage addresses, and perform an AND operation on the k storage addresses to obtain the target storage address. This greatly improves search efficiency. In addition, performing an AND operation on the k storage addresses obtained based on the target key can ensure that a unique corresponding target storage address can be obtained for each target key, thereby avoiding an address conflict.

In step 605, the calculation circuit 310 generates an index number based on the target storage address.

As described above, a forwarding entry is stored in a forwarding table. When a packet is being forwarded, a forwarding entry corresponding to a key of the packet needs to be found such that the forwarding entry can be found using the index number. Therefore, in the present disclosure, the obtained target storage address needs to be converted into a corresponding index number. When the target key in FIG. 6 and the key in FIG. 4 correspond to a same data stream, the index number obtained in step 605 is the index number in step 406.

In an implementation, the target storage address is converted into a corresponding index number using a decoding scheme of one-hot code. For example, if a third bit of the target storage address 00001000 is 1, an index number obtained using the decoding scheme of one-hot code is 3, if a fourth bit of the target storage address 00010000 is 1, an index number obtained using the decoding scheme of one-hot code is 4.

Further, the calculation circuit 310 may further send the index number to the processor such that the processor obtains, based on the index number, data corresponding to the target key. The data corresponding to the target key may be an egress interface, an operation manner, or the like, and the operation manner may be packet encapsulation, packet discarding, or the like.

Figure 8:
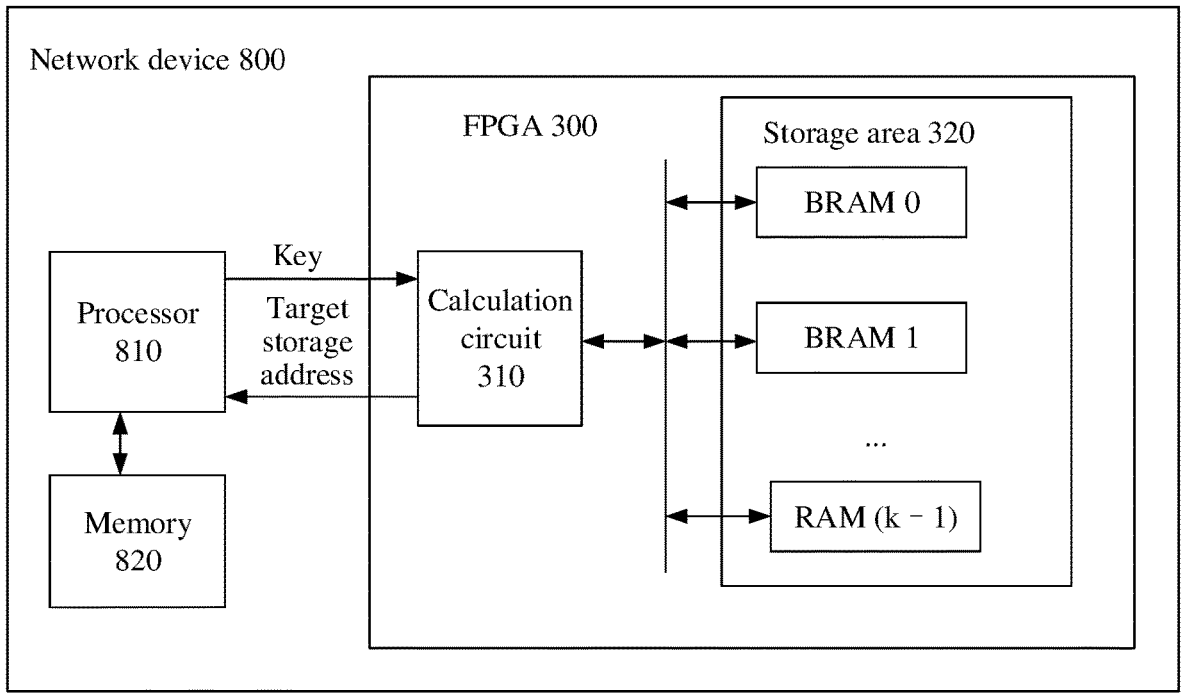
FIG. 8 is a schematic structural diagram of a network device including an FPGA according to an embodiment of the present disclosure.

Based on the FPGA provided by this embodiment of the present disclosure, as shown in FIG. 8, an embodiment of the present disclosure further provides a network device 800. The network device 800 may be a switch, a router, a server or a host with a virtual network function, or the like. The network device 800 includes a processor 810 and an FPGA 300 shown in FIG. 3. The processor 810 is configured to receive a first packet of a first data stream, generate a key and an index number based on the first packet, where a length of the key is equal to a key bit width of the FPGA 300, and the index number is used to search for a forwarding entry of the first data stream, and send the key and the index number to the FPGA 300. The processor 810 may send the key and the index number to the FPGA 300 using an internal interface or an internal bus. The FPGA 300 is configured to receive the key and the index number, divide the key into k sub-keys, where each of the k sub-keys corresponds to one of the k storage blocks, determine an address entry of each of the k sub-keys in the corresponding storage block, and write a storage address to the address entry based on the index number.

In an implementation of the present disclosure, the FPGA 300 is further configured to obtain the key bit width A of the FPGA 300, obtain an address bit width B of the FPGA, where the address bit width B is used to determine a maximum quantity of entries of an address table in each storage block of the FPGA, and determine the k storage blocks based on the key bit width A and the address bit width B.

In an implementation of the present disclosure, when determining the k storage blocks, the FPGA 300 is configured to determine the storage block quantity k corresponding to the key bit width A and the address bit width B, and determine the k storage blocks from a storage area of the FPGA 300 based on the address bit width B and the storage block quantity k.

In an implementation of the present disclosure, when writing a storage address to the address entry based on the index number, the FPGA 300 is configured to determine the address entry of each of the k sub-keys in the corresponding storage block, set a bit corresponding to the index number in the address entry to 1, and keep values of other bits in the address entry unchanged.

In an implementation of the present disclosure, when generating the index number based on the first packet, the processor 810 is configured to generate the forwarding entry for the data stream based on the first packet, write the forwarding entry to a forwarding table, and use a sequence number of the forwarding entry in the forwarding table as the index number. Usually, the sequence number of the forwarding table starts from 0, and therefore when the forwarding entry is a twentieth option of the forwarding table, the index number is 19.

In an implementation of the present disclosure, the processor 810 is further configured to receive a second packet of the first data stream, where the second packet is a subsequent packet of the first packet, generate the key based on the second packet, and send a search request to the FPGA, where the search request includes the key. Optionally, the search request is the key itself. The FPGA 300 is further configured to receive the search request, divide the key into the k sub-keys, read, using each of the k target sub-keys as an address, a storage address in an address entry in a storage block corresponding to the target sub-key, to obtain k storage addresses, perform an AND operation on the k storage addresses to obtain a target storage address, and generate the index number based on the target storage address.

Further, the FPGA 300 sends the index number to the processor 810, the processor 810 is further configured to receive the index number, obtain the forwarding entry based on the index number, and forward the second packet based on the forwarding entry.

A function of the processor 810 shown in FIG. 8 may be implemented using an integrated logic circuit of hardware in the processor 810, an instruction in a form of software, or by a combination of a hardware module and a software module in the processor 810. The software module may be located in a storage medium. The storage medium is located in a memory 820. The processor 810 reads information in the memory 820 and completes, in combination with hardware in the processor 810, the foregoing function implemented by the processor 810.

It may be understood that the memory 820 may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a RAM and is used as an external cache. It should be noted that this application is intended to include but be not limited to these memories and any other suitable type of memory.

With the network device provided by this embodiment of the present disclosure, the processor 810 can establish a forwarding entry for the received first data stream, and enable the FPGA 300 to store, in the address table, a storage address obtained based on an index number of the forwarding entry. When receiving a subsequent packet of the data stream, the processor 810 may obtain the index number corresponding to the forwarding entry using the address table in the FPGA 300, search for the forwarding entry based on the index number, and then forward the subsequent packet based on the forwarding entry. The FPGA 300 configures an address table using the method shown in FIG. 4, and searches the address table using the method shown in FIG. 6. Accordingly, the address table in the FPGA 300 is of a relatively small size and a search speed is relatively fast. Therefore, the present disclosure can improve forwarding efficiency of the network device.

The contents of the various parts of this application belong to a same inventive concept. For insufficient descriptions of one of the drawings, refer to the descriptions of the other parts.

The above are merely some embodiments of the present disclosure. It should be noted that a person skilled in the art may make several improvements and refinements without departing from the principles of the present disclosure, and these improvements and refinements should also be considered as the protection scope of the present disclosure.

What is claimed is:

1. A method for configuring an address table, the method being applied to a field-programmable gate array (FPGA), and the method comprising:
    obtaining a key, the key being generated based on a first packet of a data stream, a length of the key being equal to a key bit width of the FPGA, the FPGA comprising k storage blocks, and the k being greater than or equal to two;
    obtaining an index number corresponding to the key, the index number being used to search for a forwarding entry of the data stream;
    dividing the key into k sub-keys, each of the k sub-keys corresponding to one of the k storage blocks;
    determining an address entry of each of the k sub-keys in a corresponding storage block; and
    writing a storage address to the address entry based on the index number.

2. The method of claim 1, wherein before obtaining the key, the method further comprises:
    obtaining the key bit width of the FPGA;
    obtaining an address bit width of the FPGA, wherein the address bit width is used to determine a maximum quantity of entries of an address table in each storage block of the FPGA; and
    determining the k storage blocks based on the key bit width and the address bit width.

3. The method of claim 2, wherein determining the k storage blocks based on the key bit width and the address bit width comprises:
    determining a storage block quantity k corresponding to the key bit width and the address bit width; and
    determining the k storage blocks from a storage area of the FPGA based on the address bit width and the storage block quantity k.

4. The method of claim 1, wherein writing the storage address to the address entry based on the index number comprises:
    setting a bit corresponding to the index number in the address entry to one; and
    keeping values of other bits in the address entry unchanged.

5. The method of claim 1, further comprising:
    receiving a search request, wherein the search request is generated based on a second packet of the data stream, and wherein the search request comprises the key;
    dividing the key into the k sub-keys;

reading, using each of the k sub-keys as an address, a storage address in an address entry in a storage block corresponding to a sub-key to obtain k storage addresses;

performing an AND operation on the k storage addresses to obtain a target storage address; and generating the index number based on the target storage address.

6. A field-programmable gate array (FPGA) comprising:

k storage blocks, wherein k is greater than or equal to two; and a calculation circuit coupled to the k storage blocks and configured to:

obtain a key, wherein the key is generated based on a first packet of a data stream, and wherein a length of the key is equal to a key bit width of the FPGA;

obtain an index number corresponding to the key, wherein the index number is used to search for a forwarding entry of the data stream;

divide the key into k sub-keys, wherein each of the k sub-keys corresponds to one of the k storage blocks;

determine an address entry of each of the k sub-keys in a corresponding storage block; and write a storage address to the address entry based on the index number, wherein each of the k storage blocks being configured to store the storage address written by the calculation circuit.

7. The FPGA of claim 6, wherein before obtaining the key, the calculation circuit is further configured to:

obtain the key bit width;

obtain an address bit width of the FPGA, wherein the address bit width is used to determine a maximum quantity of entries of an address table in each storage block of the FPGA; and determine the k storage blocks based on the key bit width and the address bit width.

8. The FPGA of claim 7, wherein when determining the k storage blocks, the calculation circuit is configured to:

determine a storage block quantity k corresponding to the key bit width and the address bit width; and determine the k storage blocks from a storage area of the FPGA based on the address bit width and the storage block quantity k.

9. The FPGA of claim 8, wherein when writing the storage address to the address entry based on the index number, the calculation circuit is configured to:

determine the address entry of each of the k sub-keys in the corresponding storage block;

set a bit corresponding to the index number in the address entry to one; and keep values of other bits in the address entry unchanged.

10. The FPGA of claim 9, wherein the calculation circuit is further configured to:

receive a search request, wherein the search request being generated based on a second packet of the data stream, and wherein the search request comprises the key;

divide the key into the k sub-keys;

read, using each of the k sub-keys as an address, a storage address in an address entry in a storage block corresponding to a sub-key to obtain k storage addresses;

perform an AND operation on the k storage addresses to obtain a target storage address; and generate the index number based on the target storage address.

11. The FPGA of claim 6, wherein when writing the storage address to the address entry based on the index number, the calculation circuit is configured to:

determine the address entry of each of the k sub-keys in the corresponding storage block;

set a bit corresponding to the index number in the address entry to one; and keep values of other bits in the address entry unchanged.

12. The FPGA of claim 6, wherein the calculation circuit is further configured to:

receive a search request, wherein the search request is generated based on a second packet of the data stream, and wherein the search request comprises the key;

divide the key into the k sub-keys;

read, using each of the k sub-keys as an address, a storage address in an address entry in a storage block corresponding to a sub-key to obtain k storage addresses;

perform an AND operation on the k storage addresses to obtain a target storage address; and generate the index number based on the target storage address.

13. A network device comprising:

a field-programmable gate array (FPGA) comprising k storage blocks, wherein k is greater than or equal to two; and a processor coupled to the FPGA and configured to:

receive a first packet of a data stream;

generate a key and an index number based on the first packet, wherein a length of the key is equal to a key bit width of the FPGA, and wherein the index number is used to search for a forwarding entry of the data stream; and send the key and the index number to the FPGA, wherein the FPGA is configured to:

receive the key and the index number;

divide the key into k sub-keys, wherein each of the k sub-keys corresponds to one of the k storage blocks;

determine an address entry of each of the k sub-keys in a corresponding storage block; and write a storage address to the address entry based on the index number.

14. The network device of claim 13, wherein the FPGA is further configured to:

obtain the key bit width of the FPGA;

obtain an address bit width of the FPGA, wherein the address bit width is used to determine a maximum quantity of entries of an address table in each storage block of the FPGA; and determine the k storage blocks based on the key bit width and the address bit width.

15. The network device of claim 14, wherein when determining the k storage blocks, the FPGA is further configured to:

determine a storage block quantity k corresponding to the key bit width and the address bit width; and determine the k storage blocks from a storage area of the FPGA based on the address bit width and the storage block quantity k.

16. The network device of claim 15, wherein when writing the storage address to the address entry based on the index number, the FPGA is further configured to:

determine the address entry of each of the k sub-keys in the corresponding storage block;

set a bit corresponding to the index number in the address entry to one; and keep values of other bits in the address entry unchanged.

17. The network device of claim 16, wherein when generating the index number based on the first packet, the processor is further configured to:

generate the forwarding entry for the data stream based on the first packet;
write the forwarding entry to a forwarding table; and
set a sequence number of the forwarding entry in the forwarding table as the index number.

18. The network device of claim 17, wherein the processor is further configured to:
receive a second packet of the data stream, wherein the second packet is a subsequent packet of the first packet;
generate the key based on the second packet; and
send a search request to the FPGA, the search request comprising the key, and
wherein the FPGA is further configured to:
receive the search request;
divide the key into the k sub-keys;
read, using each of the k sub-keys as an address, a storage address in an address entry in a storage block corresponding to a sub-key to obtain k storage addresses;
perform an AND operation on the k storage addresses to obtain a target storage address; and
generate the index number based on the target storage address.

19. The network device of claim 18, wherein the FPGA is further configured to send the index number to the processor, and wherein the processor is further configured to:
receive the index number;
obtain the forwarding entry based on the index number; and
forward the second packet based on the forwarding entry.

20. The network device of claim 13, wherein the processor is further configured to:
receive a second packet of the data stream, the second packet being a subsequent packet of the first packet;
generate the key based on the second packet; and
send a search request to the FPGA, wherein the search request comprises the key, and wherein the FPGA is further configured to:
receive the search request;
divide the key into the k sub-keys;
read, using each of the k sub-keys as an address, a storage address in an address entry in a storage block corresponding to a sub-key to obtain k storage addresses;
perform an AND operation on the k storage addresses to obtain a target storage address; and
generate the index number based on the target storage address.

* * * * *